United States Patent [19]

Laughon et al.

[11] 4,411,628

[45] * Oct. 25, 1983

[54] ELECTRONIC LEARNING AID WITH PICTURE BOOK

[75] Inventors: Thomas C. Laughon; Michael I. Philpott, both of Lubbock, Tex.

[73] Assignee: Texas Instruments Incorporated, Dallas, Tex.

[*] Notice: The portion of the term of this patent subsequent to Dec. 29, 1998, has been disclaimed.

[21] Appl. No.: 301,250

[22] Filed: Sep. 11, 1981

Related U.S. Application Data

[62] Division of Ser. No. 44,437, Jun. 1, 1979, Pat. No. 4,308,017.

[51] Int. Cl.³ .............................................. G09B 7/02
[52] U.S. Cl. .................................... 434/169; 434/335
[58] Field of Search ............... 434/169, 176, 201, 335, 434/339; 273/237, 138 A, 85 G; 179/1 SA, 1 SC, 1 SM; 364/718

[56] References Cited

U.S. PATENT DOCUMENTS

| | | | |
|---|---|---|---|
| 3,508,349 | 4/1970 | Gilden et al. | 434/169 X |
| 3,535,797 | 10/1970 | Leslie et al. | 434/315 |
| 3,579,857 | 5/1971 | Lamberson | 434/339 |
| 3,584,398 | 6/1971 | Meyer et al. | 434/201 |
| 3,696,525 | 10/1982 | Cleary | 434/339 X |
| 3,795,989 | 3/1974 | Greenberg et al. | 434/339 |
| 3,832,790 | 9/1974 | Fryer, Jr. et al. | 434/324 |
| 3,894,346 | 7/1975 | Ward et al. | 434/228 |
| 3,900,722 | 8/1975 | Cochran et al. | 364/712 |
| 4,005,293 | 1/1977 | Boulanger | 200/5 A |
| 4,059,272 | 11/1977 | Pullman | 273/237 X |
| 4,073,006 | 2/1978 | Tubbs | 364/200 |
| 4,122,444 | 10/1978 | Kitajima et al. | 35/6 |
| 4,155,095 | 5/1979 | Kirschner | 273/85 G |
| 4,156,928 | 5/1979 | Inose et al. | 273/237 |
| 4,173,832 | 11/1979 | Chen et al. | 434/335 X |
| 4,189,779 | 2/1980 | Brautigham | 179/1 SA |
| 4,308,017 | 12/1981 | Laughon et al. | 434/335 X |

FOREIGN PATENT DOCUMENTS 1286822 8/1972 United Kingdom .

OTHER PUBLICATIONS

*101 Basic Computer Games;* Mar. 1975; pp. 236, 237.

*Primary Examiner*—William H. Grieb
*Attorney, Agent, or Firm*—William E. Hiller; Leo Heiting; Melvin Sharp

[57] ABSTRACT

A handheld electronic learning aid is disclosed. The learning aid is utilized for teaching and testing associations between pictorial representations and the correct responses to the pictorial representations. A selected one of an associated group of numbered printed pictorial representations is randomly selected by the learning aid, and the operator attempts to correctly respond to the pictured object. Scoring functions and displayed reward phrases provide positive reinforcement of learned skills. One embodiment of the learning aid is utilized to teach and strengthen spelling skills in young children. Additionally, anagram or other alphabetic type modes of operation can provide training and experience in literary skills.

8 Claims, 3 Drawing Figures

ELECTRONIC LEARNING AID WITH PICTURE BOOK

This is a division of application Ser. No. 044,437, filed June 1, 1979 now U.S. Pat. No. 4,308,017.

BACKGROUND OF THE INVENTION

This invention relates to electronic learning aids and teaching machines. More particularly, this invention relates to electronic learning aids having applications in the area of response association training.

Electronic learning aids are known in the prior art. In particular, those areas which are readily adaptable to electronic display, such as the mathematical skills, are common. Examples include the Dataman TM and Little Professor TM devices manufactured by Texas Instruments Incorporated, of Dallas, Tex. Devices which teach response association, spelling or other lanugage skills with an associated pictorial display, have, in the past, been relegated to those applications wherein the bulk of the required visual display would preclude the possibility of a hand-held device. Examples include U.S. Pat. No. 3,832,790 wherein an associated slide projector is utilized to provide visual stimulation, and U.S. Pat. No. 3,894,346 wherein an electronic pictorial display and a tape reader are utilized to prompt the user. It should be evident, however, that teaching machines which utilize video displays or audio prompters will be bulky, heavy and fairly expensive to manufacture.

It is, therefore, one object of this invention that the learning aid be portable and inexpensive to construct.

It is another object of this invention that the learning aid provide positive reinforcement for the operator thereof.

It was yet another object of this invention that the learning aid pose random questions to the operator thereof.

It was still another object of this invention that the learning aid receive an answer to a posed question and inform the operator whether or not the inputted answer is correct.

The foregoing objects are achieved as is now described. The device contains a non-volatile memory, within which are stored the numbers associated with a numbered group of associated pictorial displays. The correct responses to the objects portrayed in the associated pictorial displays are also stored in the non-volatile memory. A particular pictorial display number is randomly selected by the device and the operator enters a proposed response via a keyboard. The entered response is compared with the stored correct response, and the operator is apprised of the results of this comparison. Scoring results and reward phrases are utilized during the operation of the device to provide positive reinforcement to the operator.

In the embodiment disclosed, the learning aid is preferably equipped with modes of operation which relate to teaching spelling and literary skills. These modes are described in detail herein.

BRIEF DESCRIPTION OF THE DRAWINGS

The novel features believed characteristic of the invention are set forth in the appended claims. The invention itself, however, as well as a preferred mode of use, further objects and advantages thereof, will be best understood by reference to the following detailed description of illustrative embodiments thereof when read in conjunction with the accompanying drawings, wherein:

GENERAL DESCRIPTION

Figure 1A:
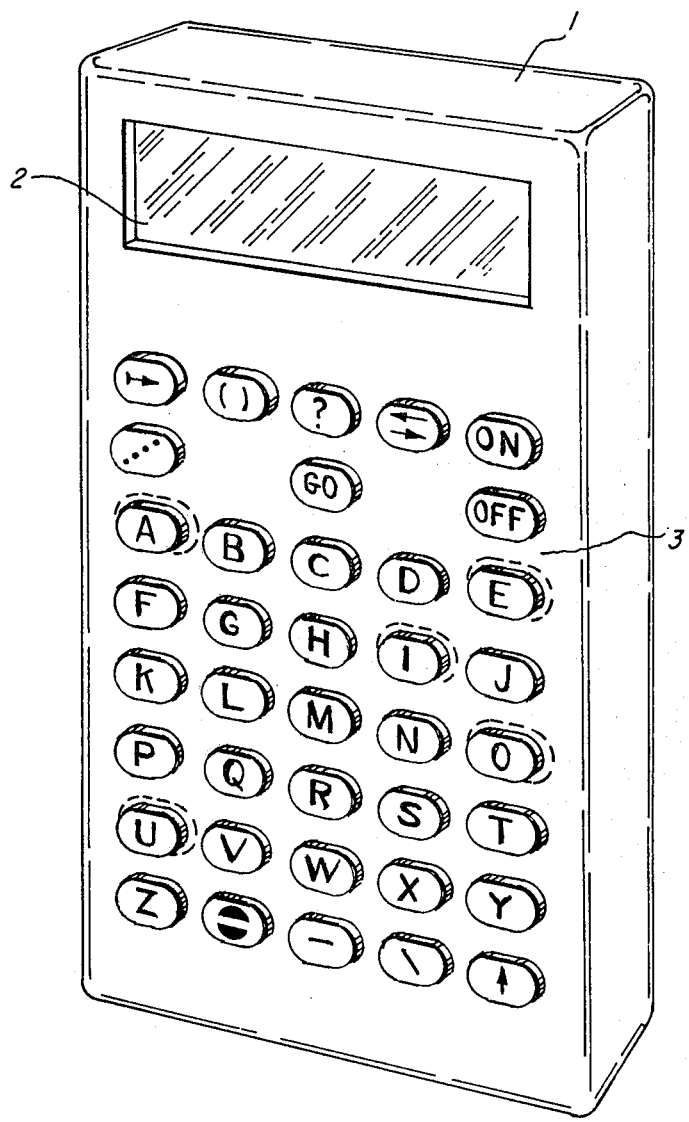
FIGS. 1a and 1b depict the learning aid and the associated pictorial display.
Figure 1B:
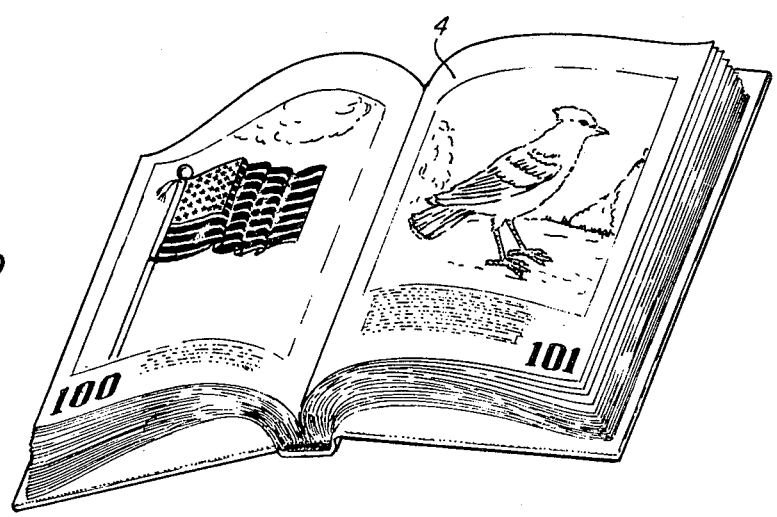

FIG. 1a is a front view of a learning aid of the type which may embody the present invention. The learning aid includes a case 1 which encloses electronic circuitry, preferably implemented on integrated circuits (not shown in this figure). These circuits are coupled to a display 2 and a keyboard 3. Also shown is a group of associated pictorial displays 4 in FIG. 1b. The display 2 is preferably of the vacuum fluorescent type; however, it will be appreciated by those skilled in the art that other display means, such as arrays of light emitting devices, liquid crystal displays or gas discharge devices may be used, if desired. Also, in this embodiment, as a matter of design choice, the display has eight character positions. The keyboard 3 of the learning aid of this embodiment has thirty-eight key switch positions, twenty-six of which are utilized to input the letters of the alphabet. Of the remaining twelve key switch positions, five are utilized for mode selection (on/spelling mode, scrambler mode, mystery word mode, missing letter mode and starts with mode), another six are utilized to control functions performed by the learning aid in its various modes of operation (enter, erase, clue, memory, level and go) and the remaining key switch is the off key.

The learning aid depicted in FIG. 1a may be battery powered or powered from a source of external electrical power, as desired. The case is preferably made from injection molded plastic and the keyboard switches may be provided by a five by eight array of key switches of the type described in U.S. Pat. No. 4,005,293, if desired. Of course, other types of case materials or switches may be used.

MODES OF OPERATION

The learning aid of this embodiment has five modes of operation which will be subsequently described. It will be evident to those skilled in the art, however, that these modes of operation may be modified, reduced in number or expanded in capability. As a matter of design choice, the learning aid of this embodiment is provided with the following modes of operation.

The first mode, the "spelling B" mode, is automatically entered when the "on" key is depressed. In the spelling mode the learning aid randomly generates a number which corresponds to a picture in the associated pictorial displays 4. In this embodiment the learning aid automatically enters the least level of difficulty. The fact that the least level of difficulty is entered is shown by displaying the word "ON" and the numeral "1". The difficulty level may be increased by depressing the "level" key and the level of difficulty will sequence through two additional levels. This will be indicated by displaying the word "ON" and the numerals "2" or "3". Having selected a level of difficulty, the "go" key is depressed and the learning aid displays the aforementioned random number. When the operator attempts to spell the object depicted in the appropriate pictorial display, the depression of the first alphabet key causes the displayed picture number to disappear and the entered letter to appear. After completing a proposed spelling, the operator depresses the "enter" key and the entered response is compared to the correct response. If the entered response is correct, the word "RIGHT" appears on the display and a new picture number is displayed. The learning aid of this embodiment will present problems in groups of five and will display the score after all five words are attempted. If the entered solution is incorrect, the word "WRONG" is momentarily displayed and the same picture number is revealed. If a second attempt to spell the object pictured in the associated pictorial display is incorrect, the learning aid displays the word "WRONG" momentarily and the correct spelling before displaying the next picture number. The "erase" key may be utilized to change a proposed response prior to depressing the "enter" key. Each depression of the "erase" key removes one letter previously entered and displayed. The "clue" key, when depressed, will provide the operator with the first letter of the pictured object. The depression of the "clue" key will cause the word to be scored as incorrect in the final score tally. The correct spelling stored in the non-volatile memory may be stored in English or any other human language. Thus, in the spelling mode, the device may be utilized to teach English spelling, or spelling and vocabulary in a foreign language, the pictorial displays being identical for either application. An example of the spelling mode is shown in Table I.

The "starts with" mode of operation is similar to the "spelling B" mode; however, it is designed for use by younger children. The operator is only required to enter the first letter of the pictorial object to obtain a correct response. All other operations are identical to the spelling mode. An example of the starts with mode is shown in Table II.

In the "missing letter" mode of operation, the learning aid selects the correct spelling of a word stored in the nonvolatile memory and displays the word with only two letters showing. Missing letter positions are indicated on the display by a dash. The operator attempts to discern which letters are missing and to enter these letters to correctly spell the partially displayed word before exceeding the maximum number of wrong guesses allowed. The number of guesses remaining is displayed in the right most position of the display. The enter and erase keys are inoperative during this mode of operation and all other responses are identical to the spelling mode. An example of the missing letter mode is shown in Table III.

In the "scramble" mode of operation, the operator may enter up to five words into the learning aid. Entered words are limited to three to seven letters, but not limited to the words corresponding to the associated pictorial displays. After choosing the "scramble" mode, the operator enters a word within the scope of the above limitations and thereafter depresses the "memory" key. Depression of the "memory" key causes the entered word to be stored in a random access memory area of the learning aid. After storing up to five words in the random access memory, depression of the "go" key causes the first word to be displayed, with its letters out of sequence. The operator, or another operator then attempts to discern the correct spelling of the "scrambled" word. The scoring and other operations are identical to the spelling mode. Another example of the scramble mode is shown in Table IV.

Finally, in the "mystery word" mode, the operator may play an electronic version of an old childrens' game. A word is chosen at random from the non-volatile memory and the appropriate number of blank spaces is indicated on the display by dashes. The operator must attempt to discern the "mystery word" by guessing letters before exceeding the maximum number of incorrect guesses. As in the missing letter mode, the "erase" and "enter" keys are inoperative and all other responses are identical to the spelling mode. An example of the mystery word mode is shown in Table V.

BLOCK DIAGRAM AND OPERATION

Figure 2:
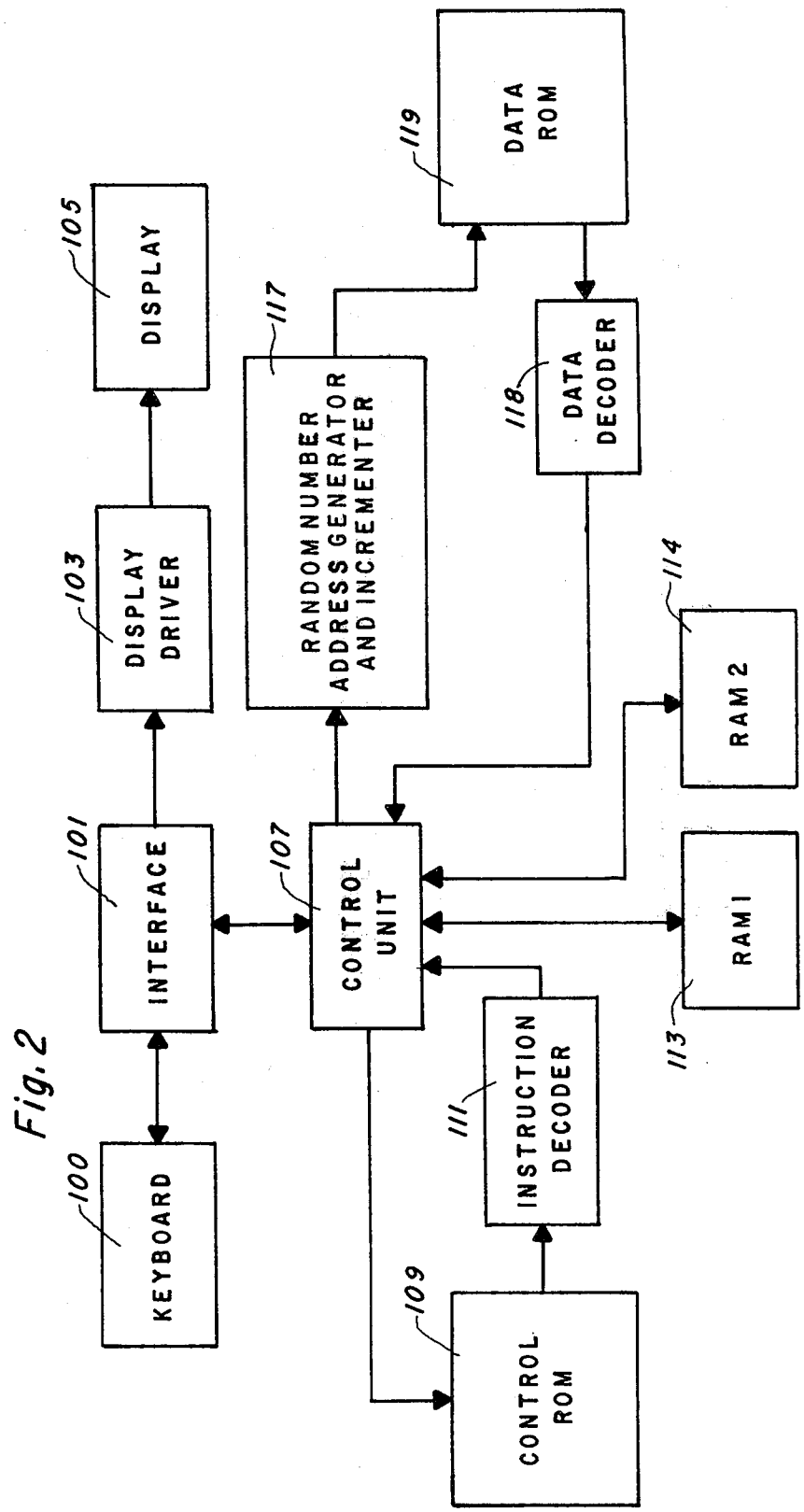
FIG. 2 depicts a logic block diagram of the learning aid.

Referring now to FIG. 2, there is depicted a logic block diagram of the learning aid of the present embodiment. The individual sections of the block diagram are well known to those skilled in the art, and the learning aid may be constructed utilizing pre-existing calculator chip type circuitry, such as is described in U.S. Pat. Nos. 4,073,006 and 3,099,722. In the embodiment disclosed, the electronic portions of the learning aid were constructed utilizing two such calculator chips.

Keyboard 100 may be a standard X-Y matrix keyboard, such as is described in U.S. Pat. No. 4,005,293. Interface 101, display driver 103 and display 105 are of the standard type circuitry found in calculator chips of the above-referenced type. Additionally, control unit 107 may be implemented with a standard calculator arithmetic logic unit, with appropriate instructions stored in control ROM 109. Control ROM 109 and data ROM 119 are standard, non-volatile read-only-memories such as find wide application in calculator technology. Similarly, instruction decoder 111 and data decoder 118 are standard decoders such as decoders 44 and 46 of U.S. Pat. No. 4,073,006. RAM 1 and RAM 2 are common random-access-memories such as RAM 31 of U.S. Pat. No. 4,073,006. Random number address generator and incrementer 117, which is utilized in conjunction with data ROM 119, may be implemented by utilizing the arithmetic logic unit, ROM and RAM of a standard calculator chip, with an appropriate algorithm. The construction of the learning aid of the present embodiment, utilizing two calculator chips, allows one ALU to be utilized as a control unit while the second ALU may be utilized to provide the random number address generator.

SPELLING MODE

In the spelling mode of operation, the actuation of the "on/spelling" key switch followed by the actuation of the "go" key switch causes Control Unit 107 to randomly access Data ROM 119 through Random Number Address Generator 117. The number of an associated pictorial display and the correct spelling of the common object depicted therein are outputted to control unit 107 through data decoder 118. Control unit 107 causes display 105 to display the aforementioned number to the operator of the learning aid. The operator of the learning aid then enters a response via keyboard 100 and and the proposed response is written into RAM 113. Upon conclusion of the operator's response, as indicated by the actuation of the "enter" key switch, control unit 107 compares the contents of RAM 113 with the correct spelling received from data ROM 119 and outputs an appropriate response to the operator via display 105. Control unit 107 will pose a sequence of five spelling problems selected from data ROM 119. As previously mentioned, the initial selection of a problem from data ROM 119 is random and each subsequent selection in a given sequence is a result of incrementing the initial random address generated by random number address generator 117. At the conclusion of a sequence of spelling problems, control unit 107 causes display 105 to display an indication of the score obtained by the operator for the sequence.

STARTS WITH MODE

In the starts with mode of operation, the learning aid operates similarly to the spelling mode of operation; however, the operator is only required to correctly enter the first letter of the common object portrayed in the associated pictorial display. All other operations are identical to the spelling mode.

MISSING LETTER MODE

In the missing letter mode of operation, the control unit 107 randomly selects the correct spelling of an object depicted in the associated pictorial display from data ROM 119 via random number address generator 117. The correct spelling is decoded via data decoder 118 and inputted to control unit 107. Control unit 107 then causes display 105 to display the chosen word with several of the letters missing. Missing letter positions are indicated on the display by a dashed line. The operator must then attempt to enter the missing letters via keyboard 100. Control unit 107 compares the inputs proposed by the operator at keyboard 100 to the actual letters required to complete the spelling of the chosen word and allows the operator of the learning aid a fixed number of incorrect guesses. If the operator is successful in determining which letters are missing from the partially displayed word, control unit 107 causes an appropriate response to be displayed by display 105.

SCRAMBLE MODE

In the scramble mode of operation, the learning aid does not enter data ROM 119. The operator of the learning aid, via keyboard 100, inputs a word which is within predetermined length parameters. Control unit 107 writes the inputted word into RAM 114 and stores it temporarily therein. Up to five words may be stored in RAM 114 during the scramble mode of operation. After the operator has finished inputting the desired words into RAM 114 via control unit 107, another operator, by depressing the "go" keyswitch, will cause each word to be displayed on display 105 with its letters out of correct sequence. The second operator then inputs via keyboard 100 a proposed correct order of spelling for the word displayed on display 105, and control unit 107 writes the proposed input into RAM 113. Upon conclusion of the proposed input, as indicated by the actuation of the "enter" keyswitch, control unit 107 compares the contents of RAM 113 with the contents of RAM 114 and outputs an appropriate response via display 105.

MYSTERY WORD MODE

In the mystery word mode of operation, the control unit 107 selects a word from data RoM 119 via random number address generator 117. The randomly selected word is outputted to control unit 107 via data decoder 118 and control unit 107 causes display 105 to display an appropriate number of blank spaces indicated by dashed lines. The operator then inputs letters via keyboard 100 to attempt to discern the mystery word before exceeding the maximum number of allowed guesses. If the operator is successful, control unit 107 causes display 105 to display an appropriate response.

ALTERNATIVE EMBODIMENTS

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. Although the disclosed embodiment teaches spelling skills, any correct response to a pictured object can be stored in the memory of the learning aid. Thus, the electronic learning aid can be utilized as an electric "flash card" to aid in the study of astronomy, biology or foreign languages. It is therefore contemplated that the appended claims will cover any such modifications or embodiments that fall within the true scope of the invention.

TABLE I

"SPELLING B" MODE

| KEY ENTRY | DISPLAY |
|---|---|
| ON (SPELLING B) | 1           O N |
| (LEVEL MAY BE CHANGED HERE) | |
| GO (#29=RED) | 29 |
| R | R |
| E | R E |
| D | R E D |
| ENTER | R I G H T |
| | 30 |
| (AFTER TWO SECONDS:) (#30=KNEE) | |
| K | K |
| N | K N |
| E | K N E |
| E | K N E E |
| E | K N E E E |
| E | K N E E E E |
| ERASE | K N E E E |
| ERASE | K N E E |
| ENTER | R I G H T |
| | 31 |
| (AFTER TWO SECONDS:) (#31=LOCK) | |
| L | L |
| O | L O |
| ENTER (IGNORED-LESS THAN THREE LETTERS) | L O |
| C | L O C |
| ENTER | W R O N G |
| | 31 |
| (AFTER TWO SECONDS:) | |
| L | L |
| O | L O |
| C | L O C |

TABLE I-continued
"SPELLING B" MODE

| KEY ENTRY | DISPLAY |
|---|---|
| K | L O C K |
| ENTER | R I G H T |
| (AFTER TWO SECONDS:) (#32=SLED) | 32 |
| CLUE | S |
| CLUE | S L |
| CLUE | S L E |
| CLUE | S L E D |
| CLUE (IGNORED) | S L E D |
| ENTER | R I G H T |
| (AFTER TWO SECONDS:) (#33=BEE) | 33 |
| B | B |
| E | B E |
| A | B E A |
| ENTER | W R O N G |
| (AFTER TWO SECONDS:) | |
| B | B |
| E | B E |
| E | B E E |
| E | B E E E |
| ENTER | W R O N G |
| (AFTER TWO SECONDS:) | B E E |
| (AFTER TWO SECONDS:) | |

NOTE:
FOLLOWING TWO DISPLAYS ALTERNATE THE (TWO SECONDS EACH) UNTIL GO IS PRESSED.    * *
INDICATES 2 OF 5 CORRECT -    2 5

NOTE: USE OF CLUE KEY CAUSED "SLED" TO BE SCORED AS WRONG. "LOCK" AND "BEE" WERE MISSED ON THE FIRST TRY AND SCORED AS WRONG.

PRESS GO TO BEGIN A NEW SET.

TABLE II
"STARTS WITH" MODE

| KEY ENTRY | DISPLAY |
|---|---|
| ON (SPELLING B) | 1    O N |
| STARTS WITH | 1 |
| (LEVEL MAY BE CHANGED HERE) | |
| GO (#2=FIVE) | 2 |
| F | F |
| ENTER | F I V E |
| (AFTER TWO SECONDS:) | |
| | R I G H T |
| (AFTER TWO SECONDS:) (#3=KEY) | 3 |
| C | C |
| ERASE | 3 |
| K | K |
| ENTER | K E Y |
| AFTER TWO SECONDS: | |
| | R I G H T |
| (AFTER TWO SECONDS:) (#4=FAN) | 4 |
| P | P |
| ENTER | W R O N G |
| (AFTER TWO SECONDS:) | 4 |
| A | A |
| ENTER | W R O N G |
| (AFTER TWO SECONDS:) | F A N |
| (AFTER FOUR SECONDS:) (#5=CUP) | 5 |
| CLUE | C |
| ENTER | C U P |
| (AFTER TWO SECONDS:) | |
| | R I G H T |
| (AFTER TWO SECONDS:) (#6=WEB) | 6 |
| W | W |
| E (IGNORED) | W |
| ENTER | W E B |

TABLE III
"MISSING LETTER" MODE

| KEY ENTRY | DISPLAY |
|---|---|
| (ON SPELLING B) | 1    O N |

TABLE III-continued
"MISSING LETTER" MODE

| KEY ENTRY | DISPLAY | | | | | | | |
|---|---|---|---|---|---|---|---|---|
| MISSING LETTER | 1 | | | | | | | |
| (LEVEL MAY BE CHANGED HERE) | | | | | | | | |
| GO | D | _ | L | _ | | | | 5 |
| L | D | _ | L | L | | | | 5 |
| A | D | _ | L | L | | | | 4 |
| O | D | O | L | L | | | | 4 |
| (AFTER TWO SECONDS:) | | | R | I | G | H | T | |
| (AFTER TWO SECONDS:) | F | I | _ | _ | | | | 5 |
| (CLUE) | F | I | S | _ | | | | 3 |
| T | F | I | S | _ | | | | 2 |
| H | F | I | S | H | | | | 2 |
| (AFTER TWO SECONDS:) | | | R | I | G | H | T | |
| (AFTER TWO SECONDS:) | D | _ | _ | S | _ | | | 5 |
| A | D | _ | _ | S | _ | | | 4 |
| B | D | _ | _ | S | _ | | | 3 |
| C | D | _ | _ | S | _ | | | 2 |
| E | D | _ | E | S | _ | | | 2 |
| CLUE (RIGHT HAND DIGIT TOO SMALL) | | | W | R | O | N | G | |
| (AFTER TWO SECONDS:) | D | _ | _ | S | _ | | | 5 |
| R | D | R | _ | S | _ | | | 5 |
| CLUE | D | R | E | S | _ | | | 3 |
| CLUE | D | R | E | S | S | | | 1 |
| (AFTER TWO SECONDS:) | | | R | I | G | H | T | |
| (AFTER TWO SECONDS:) | H | A | _ | | | | | 5 |
| T | H | A | _ | | | | | 4 |
| M | H | A | M | | | | | 4 |
| (AFTER TWO SECONDS:) | | | R | I | G | H | T | |
| (AFTER TWO SECONDS:) | F | _ | _ | T | | | | 5 |
| E | F | E | E | T | | | | 5 |
| (AFTER TWO SECONDS:) | | | R | I | G | H | T | |
| (AFTER TWO SECONDS:) | | | | | | | | |

NOTE:
THE FOLLOWING TWO DISPLAYS ALTERNATE,
TWO SECONDS EACH, UNTIL GO IS PRESSED
INDICATES 4 OF 5 CORRECT -         • • • •

NOTE: USE OF CLUE DECREMENTS RIGHT-HAND     4    5
DIGIT BY TWO, BUT USER CAN STILL GET CORRECT
SCORE.

NOTE: ERASE AND ENTER ARE IGNORED IN
THIS MODE.

TABLE IV
"SCRAMBLE" MODE

| KEY ENTRY | DISPLAY | | | | | | |
|---|---|---|---|---|---|---|---|
| ON (SPELLING B) | 1 | | | O | N | | |
| SCRAMBLE | S | C | R | A | M | B | L | E |
| J | J | | | | | | |
| A | J | A | | | | | |
| C | J | A | C | | | | |
| K | J | A | C | K | | | |
| MEMORY BANK | S | C | R | A | M | B | L | E |
| J | J | | | | | | |
| I | J | I | | | | | |
| L | J | I | L | | | | |
| L | J | I | L | L | | | |
| MEMORY BANK | S | C | R | A | M | B | L | E |
| GO | _ | A | J | K | C | | |
| K | K | _ | A | J | C | | |
| J | K | J | _ | A | C | | |
| ERASE | K | _ | A | J | C | | |
| ERASE | _ | A | J | K | C | | |
| J | J | _ | A | K | C | | |
| A | J | A | _ | K | C | | |
| C | J | A | C | _ | K | | |
| K | J | A | C | K | _ | | |
| ENTER | | | R | I | G | H | T |
| (AFTER TWO SECONDS:) | _ | I | L | J | L | | |
| J | J | _ | I | L | L | | |
| L | J | L | _ | I | L | | |
| L | J | L | L | _ | I | | |
| I | J | L | L | I | _ | | |
| ENTER | | | W | R | O | N | G |
| (AFTER TWO SECONDS:) | _ | I | L | J | L | | |
| J | J | _ | I | L | L | | |

TABLE IV-continued

"SCRAMBLE" MODE

| KEY ENTRY | DISPLAY |
|---|---|
| CLUE | J I _ L L |
| L | J I L _ L |
| L | J I L L _ |
| ENTER | R I G H T |

NOTE:
THE FOLLOWING TWO DISPLAYS ARE
ALTERNATED, TWO SECONDS EACH,
UNTIL GO IS PRESSED.
INDICATES 1 OF 2 CORRECT -

*
                              1 2

SCORING IS AS DESCRIBED IN
TABLE I. LEVEL IS NOT USED
IN THIS MODE.

TABLE V

"MYSTERY WORD" MODE

| KEY ENTRY | DISPLAY | |
|---|---|---|
| ON (SPELLING B) | 1 | O N |
| MYSTERY WORD | 1 | ? |
| (LEVEL MAY BE CHANGED HERE) | | |
| GO | _ _ _ _ | 9 |
| A | _ _ _ _ | 8 |
| E | _ _ _ _ | 7 |
| I | | 6 |
| O | _ O _ _ | 6 |
| U | _ O _ _ | 5 |
| CLUE | D O _ _ | 3 |
| CLUE | D O L _ | 1 |
| L | | |
| TWO DISPLAYS FLASH ALTERNATELY, | D L L | |
| | D O | |
| TWO SECONDS EACH. THIS CONTINUES | | |
| UNTIL GO IS PRESSED. | Y O U W I N | |
| GO | _ _ _ _ _ | 9 |
| A | | 8 |
| E | _ _ E _ _ | 8 |
| I | _ _ E _ _ | 7 |
| O | _ _ E _ _ | 6 |
| U | _ _ E _ _ | 5 |
| B | _ _ E _ _ | 4 |
| C | _ _ E _ _ | 3 |
| D | D _ E _ _ | 3 |
| F | D _ E _ _ | 2 |
| G | D _ E _ _ | 1 |
| TWO DISPLAYS FLASH ALTERNATELY, | D R E S S | |
| TWO SECONDS EACH, UNTIL GO IS | I W I N | |
| PRESSED. | | |
| GO | | |

NOTE:
IN THIS MODE, USE OF THE CLUE
KEY CAUSES THE RIGHT-HAND
NUMBER TO DECREMENT BY TWO, BUT
THE USER CAN STILL WIN.

ERASE AND ENTER ARE IGNORED.

What is claimed is:

1. A learning aid system for teaching and testing associations between pictorial representations and correct responses to said pictorial representations, said system comprising:

a plurality of pictorial representations to which operator responses are desired, each of said pictorial representations having an intended appropriate operator response different from the others;

means for identifying one of said plurality of pictorial representations to which an operator response is desired;

memory means independent of said plurality of pictorial representations and storing respective correct responses associated with each of said pictorial representations;

operator input means for receiving an input from an operator of the learning aid system as a proposed response to the selected one of said plurality of pictorial representations;

comparator means operably associated with said operator input means and said memory means for comparing the input received by said operator input means from the operator with the correct response stored in said memory means for said selected one of said plurality of pictorial representations and for providing an output indicative of the comparison therebetween; and presentation means responsive to the output of said comparator means for producing a presentation for comprehension by the operator indicative of the appropriateness of the input received by said operator input means with respect to said selected one of said plurality of pictorial representations.

2. A learning aid system as set forth in claim 1, wherein said operator input means comprises a keyboard.

3. A learning aid system as set forth in claim 1, further including a book having a plurality of pages on which said plurality of pictorial representations appear.

4. A learning aid system as set forth in claim 1, wherein the desired operator response to said selected one of said plurality of pictorial representations is a proposed spelling of the representation shown thereon;
said operator input means being effective to receive an input from an operator as to the proposed spelling of the representation shown in said selected one of said plurality of pictorial representations; and
said comparator means being effective to compare the proposed spelling received by said operator input means as an input from an operator with the correct spelling stored in said memory means and for providing an output indicative of the comparison therebetween.

5. A learning aid system for teaching and testing associations between pictorial representations and correct responses to said pictorial representations, said system comprising:
a plurality of pictorial representations to which operator responses are desired, each of said pictorial representations having an intended appropriate operator response different from the others;
means for identifying one of said plurality of pictorial representations to which an operator response is desired by generating indicia corresponding to a particular one of said plurality of pictorial representations in the selection thereof;
memory means for storing a correct response associated with each of said pictorial representations;
operator input means for receiving an input from an operator of the learning aid system as a proposed response to the selected one of said plurality of pictorial representations;
comparator means operably associated with said operator input means for comparing the input received by said operator input means from the operator with the correct response stored in said memory means for said selected one of said plurality of pictorial representations and for providing an output indicative of the comparison therebetween; and
presentation means responsive to the output of said comparator means for producing a presentation for comprehension by the operator indicative of the appropriateness of the input received by said operator input means with respect to said selected one of said plurality of pictorial representations, said presentation means being coupled to said identifying means for presenting said indicia generated by said identifying means in identifying the said selected one of said plurality of pictorial representations to which an operator response is desired.

6. A learning aid system as set forth in claim 5, wherein said presentation means comprises a visual display.

7. A learning aid system as set forth in claim 6, wherein the desired operator response to said selected one of said plurality of pictorial representations is a proposed spelling of the representation shown thereon;
said operator input means being effective to receive an input from an operator as to the proposed spelling of the representation shown in said selected one of said plurality of pictorial representations; and
said comparator means being effective to compare the proposed swelling received by said operator input means as an input from an operator with the correct spelling stored in said memory means and for providing an output indicative of the comparison therebetween.

8. A learning aid system as set forth in claim 5, wherein the desired operator response to said selected one of said plurality of pictorial representations is a proposed spelling of the representation shown thereon;
said operator input means being effective to receive an input from an operator as to the proposed spelling of the representation shown in said selected one of said plurality of pictorial representations; and
said comparator means being effective to compare the proposed spelling received by said operator input means as an input from an operator with the correct spelling stored in said memory means and for providing an output indicative of the comparison therebetween.

* * * * *